(12) United States Patent
Leifman et al.

(10) Patent No.: US 12,541,854 B2
(45) Date of Patent: Feb. 3, 2026

(54) SEGMENTATION GENERATION FOR IMAGE-RELATED FUNCTIONS

(71) Applicant: Verily Life Sciences LLC, South San Francisco, CA (US)

(72) Inventors: George Leifman, Zikhron Yaaqov (IL); Amit Aides, Haifa (IL); Tomer Golany, Haifa (IL); Daniel Freedman, Haifa (IL); Ehud Rivlin, Haifa (IL)

(73) Assignee: Verily Life Sciences LLC, Dallas, TX (US)

( * ) Notice: Subject to any disclaimer, the term of this patent is extended or adjusted under 35 U.S.C. 154(b) by 420 days.

(21) Appl. No.: 17/990,392

(22) Filed: Nov. 18, 2022

(65) Prior Publication Data

US 2023/0162364 A1 May 25, 2023

Related U.S. Application Data

(60) Provisional application No. 63/264,352, filed on Nov. 19, 2021.

(51) Int. Cl.
*G06T 19/00* (2011.01)
*G06T 7/10* (2017.01)
*G06V 10/764* (2022.01)

(52) U.S. Cl.
CPC .............. *G06T 7/10* (2017.01); *G06V 10/764* (2022.01); *G06T 2207/20084* (2013.01); *G06V 2201/034* (2022.01)

(58) Field of Classification Search
CPC ......... G06T 2207/20084; G06T 11/001; G06T 2207/10016; G06T 2207/20081;
(Continued)

(56) References Cited

U.S. PATENT DOCUMENTS

2020/0035350 A1* 1/2020 Sullivan ................ G06T 11/001
2020/0237452 A1* 7/2020 Wolf ....................... G06F 3/048
(Continued)

FOREIGN PATENT DOCUMENTS

WO WO-2019164271 A1 * 8/2019 ............. G06T 17/20
WO WO-2020159276 A1 * 8/2020 ............... G06N 3/08

OTHER PUBLICATIONS

PCT/US2022/080158, "International Search Report and Written Opinion", Mar. 3, 2023, 11 pages.
(Continued)

*Primary Examiner* — Quan M Hua
(74) *Attorney, Agent, or Firm* — Kilpatrick Townsend & Stockton LLP

(57) ABSTRACT

A computer system may perform an image-related function using a segmentation (e.g., an image mask) that has been generated by a custom segmentation machine learning model. To begin, the system may receive image data corresponding to a surgical scene including a background that includes an anatomical feature and at least one surgical tool. The system may also generate segmentation data using the custom segmentation machine learning model based on inputting the first image data to the custom segmentation machine learning model. The system may also include generating a segmentation of the at least one surgical tool using the segmentation data. Once the segmentation has been generated, the system may perform an image-related function using the segmentation.

25 Claims, 8 Drawing Sheets

(58) Field of Classification Search
CPC . G06T 2207/30024; G06T 2207/30232; G06T 2210/41; G06T 7/0014; G06T 7/11; G06T 7/20; A61B 90/361; A61B 2017/00119; A61B 2034/256; G16H 20/40; G16H 40/40; G16H 10/40; G16H 10/60; G16H 15/00; G16H 30/20; G16H 30/40; G16H 40/20; G16H 40/67; G16H 50/20; G16H 50/50; G16H 70/00; G06V 20/46; G06V 20/52; G06V 20/54; G06V 2201/08; G06V 40/10

See application file for complete search history.

(56) References Cited

U.S. PATENT DOCUMENTS

| | | | | |
|---|---|---|---|---|
| 2020/0367974 | A1* | 11/2020 | Khalid | A61B 34/20 |
| 2021/0030483 | A1* | 2/2021 | Jin | B25J 9/1697 |
| 2021/0042532 | A1* | 2/2021 | Latapie | G06V 40/10 |
| 2021/0236227 | A1* | 8/2021 | Kumar | A61B 90/90 |

OTHER PUBLICATIONS

Fuentes-Hurtado et al., "EasyLabels: weak labels for scene segmentation in laparoscopic videos", International journal of computer assisted radiology and surgery 14.7 (2019): 1247-1257,.
Garcia-Peraza-Herrera et al., "Image compositing for segmentation of surgical tools without manual annotations", IEEE transactions on medical imaging 40.5 (2021): 1450-1460.
Shvets et al., "Automatic instrument segmentation in robot-assisted surgery using deep learning", 2018 17th IEEE international conference on machine learning and applications (ICMLA). IEEE, 2018.
Abadi et al., TensorFlow: Large-Scale Machine Learning on Heterogeneous Distributed Systems, Available Online at: http://tensorflow.org/, Nov. 9, 2015, 19 pages.
Allan et al., 2017 Robotic Instrument Segmentation Challenge, Available Online at: https://arxiv.org/pdf/1902.06426.pdf, Feb. 21, 2019, 14 pages.
Attia et al., Surgical Tool Segmentation Using A Hybrid Deep CNN-RNN Auto Encoder-Decoder, IEEE International Conference on Systems, Man, and Cybernetics (SMC), Oct. 5-8, 2017, pp. 3373-3378.
Badrinarayanan et al., SegNet: A Deep Convolutional Encoder-Decoder Architecture for Image Segmentation, IEEE Transactions on Pattern Analysis and Machine Intelligence, vol. 39, No. 12, Dec. 2017, pp. 2481-2495.
Bernard et al., Deep Learning Techniques for Automatic MRI Cardiac Multi-Structures Segmentation and Diagnosis: Is the Problem Solved?, IEEE Transactions on Medical Imaging, vol. 37, No. 11, May 17, 2018, pp. 1-12.
Birodkar et al., The Surprising Impact of Mask-Head Architecture on Novel Class Segmentation, IEEE/CVF International Conference on Computer Vision (ICCV), Oct. 10-17, 2021, pp. 7015-7025.
Bodenstedt et al., Comparative Evaluation of Instrument Segmentation and Tracking Methods in Minimally Invasive Surgery, Available Online at: https://arxiv.org/pdf/1805.02475.pdf, May 7, 2018, 14 pages.
Bouget et al., Detecting Surgical Tools by Modelling Local Appearance and Global Shape, IEEE Transactions on Medical Imaging, vol. 34, No. 12, Dec. 2015, pp. 2603-2617.
Chen et al., DeepLab: Semantic Image Segmentation with Deep Convolutional Nets, Atrous Convolution, and Fully Connected CRFs, IEEE Transactions on Pattern Analysis and Machine Intelligence, vol. 40, No. 4, May 12, 2017, pp. 1-14.
Chen et al., Encoder-Decoder with Atrous Separable Convolution for Semantic Image Segmentation, Computer Vision-European Conference on Computer Vision, Oct. 6, 2018, pp. 833-851.
Colleoni et al., Robotic Instrument Segmentation with Image-to-Image Translation, IEEE Robotics and Automation Letters, vol. 6, No. 2, Jan. 2021, 8 pages.
Colleoni et al., Synthetic and Real Inputs for Tool Segmentation in Robotic Surgery, iInternational Conference on Medical Image Computing and Computer-Assisted Intervention, Available Online at: https://arxiv.org/pdf/2007.09107.pdf, Jul. 26, 2020, 11 pages.
Doignon et al., Segmentation and Guidance of Multiple Rigid Objects for Intra-Operative Endoscopic Vision, vol. 4358, 2006, pp. 314-327.
Garcia-Peraza-Herrera et al., Toolnet: Holistically-Nested Real-Time Segmentation of Robotic Surgical Tools, IEEE/RSJ International Conference on Intelligent Robots and Systems (IROS), Sep. 24-28, 2017, 6 pages.
Gonzalez et al., ISINet: An Instance-Based Approach for Surgical Instrument Segmentation, in International Conference on Medical Image Computing and Computer-Assisted Inter-vention, Jul. 10, 2020, 13 pages.
Gupta et al., Safe Laparoscopic Cholecystectomy: Adoption of Universal Culture of Safety in Cholecystectomy, World Journal of Gastrointestinal Surgery, vol. 11, No. 2, Feb. 27, 2019, pp. 62-84.
Gupta et al., The r4u Planes for the Zonal Demarcation for Safe Laparoscopic Cholecystectomy, World Journal of Surgery, vol. 45, No. 4, Jan. 24, 2021, pp. 1096-1101.
Havaei, Brain Tumor Segmentation with Deep Neural Networks, Medical image analysis, vol. 35. Available Online at: https://arxiv.org/pdf/1505.03540.pdf, May 20, 2016, 17 pages.
He et al., Mask R-CNN, IEEE International Conference on Computer Vision (ICCV), Oct. 22-29, 2017, pp. 2961-2969.
Iglovikov et al., TernausNet: U-Net with VGG11 Encoder Pre-Trained on ImageNet for Image Segmentation, Available Online at: https://arxiv.org/pdf/1801.05746.pdf, Jan. 17, 2018, 5 pages.
Ioffe et al., Batch Normalization: Accelerating Deep Network Training by Reducing Internal Covariate Shift, Proceedings of the 32nd International Conference on Machine Learning, Mar. 2015, 9 pages.
Isensee et al., nnU-Net: Self-Adapting Framework for U-Net-Based Medical Image Segmentation, Available Online at: https://arxiv.org/pdf/1809.10486.pdf, Sep. 27, 2018, 11 pages.
Isensee et al., OR-UNet: An Optimized Robust Residual U-Net for Instrument Segmentation in Endoscopic Images, Available Online at: https://arxiv.org/pdf/2004.12668.pdf, Apr. 27, 2020, 8 pages.
Islam et al., AP-MTL: Attention Pruned Multi-Task Learning Model for Real-Time Instrument Detection and Segmentation in Robot-Assisted Surgery, IEEE International Conference on Robotics and Automation (ICRA), May 31, 2020, 7 pages.
Jin et al., Tool Detection and Operative Skill Assessment in Surgical Videos Using Region-Based Convolutional Neural Networks, 2018 IEEE Winter Conference on Applications of Computer Vision (WACV), Jul. 22, 2018, 9 pages.
Kingma et al., ADAM: A Method for Stochastic Optimization, International Conference on Learning Representations, Dec. 22, 2014, 9 pages.
Lee et al., DavinciGAN: Unpaired Surgical Instrument Translation for Data Augmentation, International Conference on Medical Imaging with Deep Learning Proceedings of Machine Learning Research, vol. 102, 2019, pp. 326-336.
Lin et al., Automatic Sinus Surgery Skill Assessment Based on Instrument Segmentation and Tracking in Endoscopic Video, Multiscale Multimodal Medical Imaging: First International Workshop, Dec. 20, 2019, pp. 93-100.
Lin et al., Microsoft COCO: Common Objects in Context, In European Conference on Computer Vision, May 2014, pp. 740-755.
Newell et al., Stacked Hourglass Networks for Human Pose Estimation, European conference on computer vision Available Online at: https://arxiv.org/pdf/1603.06937.pdf, Jul. 26, 2016, 17 pages.
Ni et al., RASNet: Segmentation for Tracking Surgical Instruments in Surgical Videos Using Refined Attention Segmentation Network, 41st Annual International Conference of the IEEE Engineering in Medicine and Biology Society (EMBC), Sep. 19, 2019, 4 pages.
Pakhomov et al., Deep Residual Learning for Instrument Segmentation in Robotic Surgery, Available Online at: https://arxiv.org/pdf/1703.08580.pdf, Mar. 24, 2017, 9 pages.

(56) References Cited

OTHER PUBLICATIONS

Pakhomov et al., Towards Unsupervised Learning for Instrument Segmentation in Robotic Surgery with Cycle-Consistent Adversarial Networks, Available Online at: https://arxiv.org/pdf/2007.04505.pdf, Jul. 9, 2020, 7 pages.

Pfeiffer et al., Generating Large Labeled Data Sets for Laparoscopic Image Processing Tasks Using Unpaired Image-to-Image Translation, International Conference on Medical Image Computing and Computer-Assisted Intervention, Available Online at: https://arxiv.org/pdf/1907.02882.pdf, Jul. 5, 2019, 9 pages.

Rob et al., Comparative Validation of Multi-Instance Instrument Segmentation in Endoscopy: Results of the ROBUST-MIS 2019 Challenge, Medical Image Analysis, vol. 70, No. 101920, May 2021, pp. 1-26.

Rother et al., "GrabCut"—Interactive Foreground Extraction Using Iterated Graph Cuts, ACM Transactions on Graphics, vol. 23, No. 3, Aug. 2004, 6 pages.

Roy et al., Concurrent Spatial and Channel 'Squeeze & Excitation' in Fully Convolutional Networks, Available Online at: https://arxiv.org/pdf/1803.02579.pdf, Jun. 8, 2018, 8 pages.

Sahu et al., Endo-Sim2Real: Consistency Learning-Based Domain Adaptation for Instrument Segmentation, International Conference on Medical Image Computing and Computer-Assisted Intervention Available Online at: https://arxiv.org/pdf/2007.11514.pdf, Jul. 22, 2020, 13 pages.

Sahu et al., Simulation-to-Real Domain Adaptation with Teacher-Student Learning for Endoscopic Instrument Segmentation, International Journal of Computer Assisted Radiology and Surgery, vol. 16, No. 5, May 2021, pp. 849-859.

Twinanda et al., EndoNet: A Deep Architecture for Recognition Tasks on Laparoscopic Videos, IEEE Transactions on Medical Imaging, vol. 36, No. 1, May 23, 2016, pp. 1-11.

Zhou et al., Objects as Points, Available Online at: https://arxiv.org/pdf/1904.07850.pdf, Apr. 25, 2019, 12 pages.

Zhu et al., Unpaired Image-to-Image Translation using Cycle-Consistent Adversarial Networks, Proceedings of the IEEE international conference on computer vision, Oct. 2017, pp. 2223-2232.

\* cited by examiner

SEGMENTATION GENERATION FOR IMAGE-RELATED FUNCTIONS

CROSS REFERENCE TO RELATED APPLICATION(S)

This application is a Nonprovisional of and claims priority to U.S. Provisional Application No. 63/264,352, filed Nov. 19, 2021, and titled "Pixel-Accurate Segmentation Of Surgical Tools Based On Bounding Box Annotations," the contents of which are herein incorporated in its entirety.

BACKGROUND

Computers can be used to identify objects in images. Similarly, computers can be used to segment the objects in the images, which can include binary decisions as to whether any given pixel is part of a particular object or not. The results of these decisions can be used for further processing of the image and other similar functions.

BRIEF SUMMARY

Various examples are described including systems, methods, and devices relating to generating pixel-accurate segmentations of surgical tools using predictive models.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method. The computer-implemented method includes receiving first image data corresponding to a surgical scene including a background that includes an anatomical feature and at least one surgical tool. The computer-implemented method also includes generating segmentation data using a first machine learning model based on inputting the first image data to the first machine learning model, where the first machine learning model is based on: a first set of segmentations output from a second machine learning model based on a first set of inputs including (i) a set of real images of a first set of surgical scenes, and (ii) a set of bounding boxes identifying a set of real surgical tools in the set of real images; a set of synthetic images of a second set of surgical scenes; and a second set of segmentations corresponding to the set of synthetic images. The computer-implemented method also includes generating a segmentation of the at least one surgical tool using the segmentation data. The computer-implemented method also includes performing an image-related function using the segmentation. Other embodiments of this aspect include corresponding computer systems, apparatus, and computer programs recorded on one or more computer storage devices, each configured to perform the actions of the methods.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
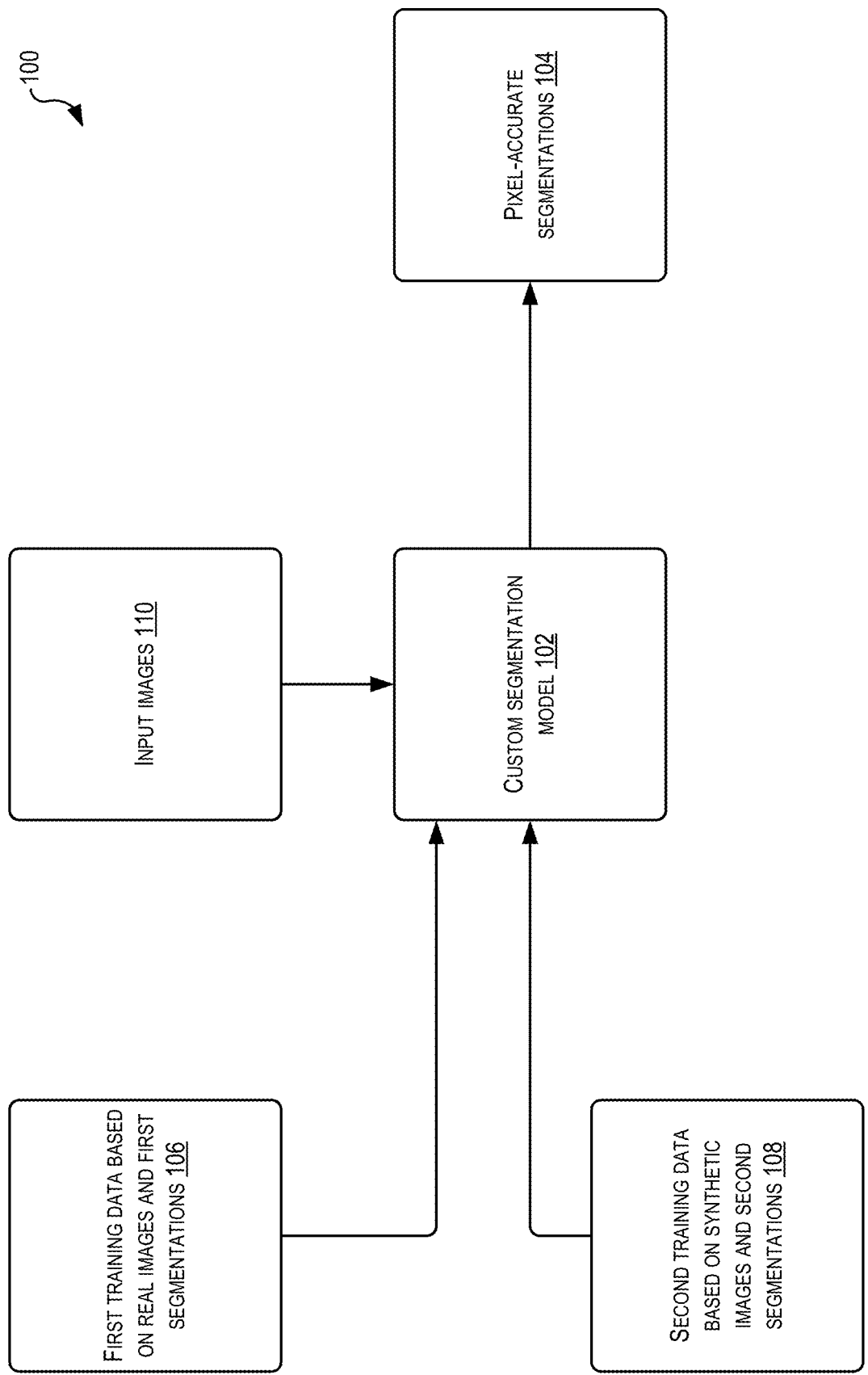
FIG. 1 illustrates a block diagram corresponding to a process for training a segmentation model and using the segmentation model to generate pixel-accurate segmentations of surgical tools, according to at least one example.

Examples are described herein in the context of segmentations of surgical tools for use in surgical methods, including those performed within a robotic surgical environment. Those of ordinary skill in the art will realize that the following description is illustrative only and is not intended to be in any way limiting. For example, the techniques described herein can be used to generate segmentations of objects other than surgical tools and the techniques are applicable to surgical environments outside of robotic ones. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Laparoscopic surgery is a form of minimally invasive surgery (MIS) that involves using small incisions sized to receive surgical tools and an endoscopic or other camera capable of providing video of a surgical scene (e.g., internal anatomy of a patient). The video is provided to a display in real-time, which allows a surgeon or other user to correctly position the surgical tools with respect to the internal anatomy of the patient. MIS techniques can also be augmented by computer-assisted interventions (CAI). This can include using image data from the camera to help the surgeon position the surgical tools. In some examples, a CAI approach may be implemented by a robotic surgical system that is controlled by a surgeon in a remote or local environment.

The image data can be used for surgical tool identification and segmentation, which is an intermediate step for providing CAI. The techniques described herein are directed to a segmentation model that can be used to quickly generate accurate segmentations of surgical tools. The segmentation model, which is trained using two different types of image data and two different annotations, may be more accurate and less expensive to develop than conventional models.

Generally, a first type of image data and corresponding annotations for training the segmentation model may be generated cheaply, quickly, and efficiently. For example, rather than pay specially trained individuals to generate training data by tracing precisely around surgical tools, the first type of image data is generated from bounding box annotations. The bounding box annotations are usually rectangles or other predefined shapes that generally identify regions of interest (e.g., regions that include surgical tools). Obtaining bounding box training data is much less expensive than more-specific segmentation-type training data. Generally, the second type of image data and corresponding annotations for training the segmentation model may also be generated cheaply and quickly, and in a way that does not require human intervention and is distinguishing from the first type of image data and corresponding annotations. This is because the second type of image data and annotations may be based almost entirely on computer-generated "synthetic" data. The synthetic data may be based on images of real surgical scenes. This is done to better approximate what real surgical scenes might look like.

Turning now to the first type of image data in more detail, the first type of image data includes real images of surgical scenes that have been annotated using bounding boxes to identify surgical tools. Annotating surgical tools with bounding boxes is relatively inexpensive and can be made rather quickly as compared to the conventional approaches for generating annotations that includes segmenting the surgical tools. The real images and the annotations are input into a first machine learning model to generate a first set of annotations (e.g., pixel-accurate tool segmentations). The real images and the corresponding first set of annotations are provided as first input data to the segmentation model.

Turning now to the second type of image data in more detail, the second type of image data includes synthetic images of surgical scenes that have been annotated with a second set of annotations (e.g., pixel-accurate tool segmentations). The synthetic images may be generated using a simulation tool and may be augmented using a second machine learning model. The second set of segmentations may be generated directly from three-dimensional models of the surgical tools, which were used to generate the synthetic images. The second machine learning model augments the synthetic images by adapting them to the surgical domain (e.g., by changing properties of the synthetic images to make them look more realistic for a surgical scene). The synthetic images, whether augmented or not, and the second set of segmentations are provided as second input data to the segmentation model.

Once the segmentation model has been trained, as described herein, the segmentation model may be used to generate segmentations of surgical tools based on new image data (e.g., a new video stream of a surgical scene). A corresponding computer system may use the segmentations to perform image-related functions. For example, such image-related functions can include operations such as using the segmentations for image processing (e.g., adjusting white balance in the video feed), controlling operation of a robotic surgical system (e.g., position/feedback signals to the robotic surgical system), identifying a tool type used in the surgical scene, updating a tool-tracking record with the identified tool type, confirming that all tools have been removed from the surgical scene, and other similar functions.

Turning now to a particular example, in this example is provided a computer system for performing the techniques described herein. The computer system is configured to train a segmentation model. The computer system is also configured to use the segmentation model to generate segmentations. The segmentations can be used to improve surgical methods, such as those performed laparoscopically. In some examples, the computer system that trains the segmentation model is different from a computer system that uses the trained segmentation model. In any event, the computer system includes a segmentation neural network, a simulation tool, and a domain-translating neural network. Bounding box annotations of surgical images and the images themselves are input into the segmentation neural network, and the segmentation neural network outputs first pixel-accurate segmentations. The first pixel-accurate segmentations and corresponding surgical images are used to train the segmentation model. Other surgical images, three-dimensional models of surgical tools, and three-dimensional tools of organs are input into the simulation tool, which outputs synthetic images and second pixel-accurate segmentations. The synthetic images may also be input into the domain-translating neural network to adapt the synthetic images to the surgical domain. The second pixel-accurate segmentations and the synthetic images are used to train the segmentation model. Once the segmentation model has been trained, the computer system may receive images of a surgical scene, input them into the segmentation model, and based on segmentations of surgical tools output from the segmentation model, perform various functions. A segmentation may identify more than one surgical tool, which may be present in each image of the input images (e.g., frames of a video feed). The various functions can range from controlling a robotic surgical system to adjusting a characteristic of each frame in the video feed.

This illustrative example is given to introduce the reader to the general subject matter discussed herein and the disclosure is not limited to this example. The following sections describe various additional non-limiting examples techniques relating to generating and using pixel-accurate segmentations of surgical tools.

The techniques described herein solve one or more technical problems identified herein. These solutions may involve an improved approach for instrument segmentation in laparoscopic surgeries that relies on weak and fast annotations provided as bounding boxes. The solutions may also involve incorporating synthetic images into training of a segmentation model based on generating the synthetic images by rendering laparoscopic scenes using Blender3D and then making these images more realistic by applying CycleGAN. Finally, the solutions may also involve a trained segmentation model (e.g., based on a combination of training data sets) that outperforms (e.g., are more accurate) previously known methods for generating segmentations.

Turning now to the figures, FIG. 1 illustrates a block diagram corresponding to a process 100 for training a segmentation model 102 and using the segmentation model 102 to generate pixel-accurate segmentations 104 of surgical tools, according to at least one example. The diagram of FIG. 1 is used to generally introduce the reader to the subject matter of the specification. Subsequent figures will describe the parts of training the segmentation model 102 and using the segmentation model 102 in more detail. Generally, the process 100 may be performed by one or more computer systems (e.g., a computer device 800 or other computer system described herein). For example, a first computer system may be used to perform a training portion of the process and a second computer system may be used to generate the pixel-accurate segmentations 104. In some examples, the second computer system, or even a third computer system, may use the pixel-accurate segmentations 104 to perform various functions, such as those described herein.

The segmentation model 102 may be referred to as a custom segmentation model 102 because it has been custom trained for a particular task, e.g., segment surgical tools in images (e.g., images). The approaches described herein may be applied similarly to train other segmentation models to perform other particular tasks, including segmentation of other objects found in different types of images.

Figure 2:
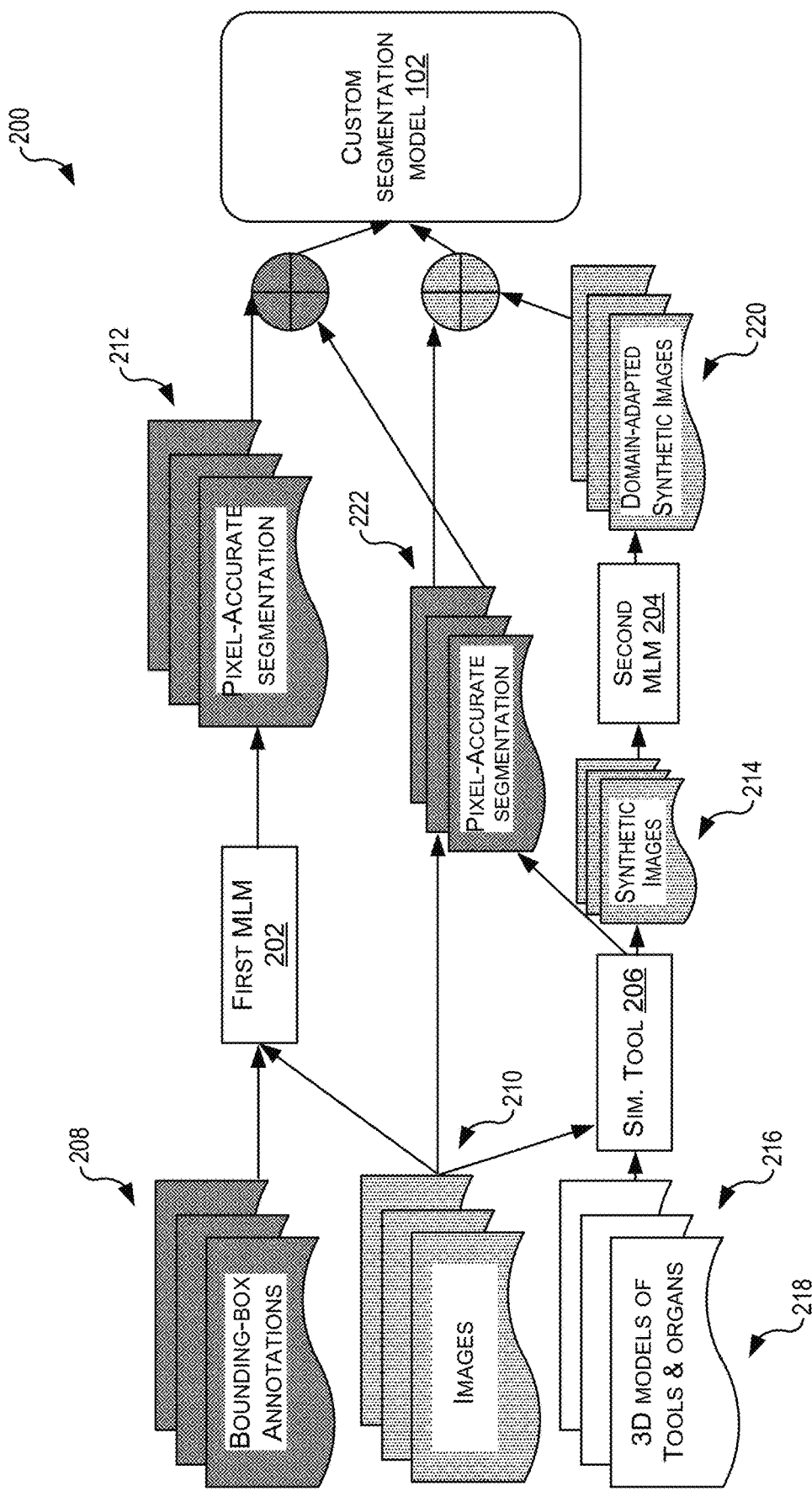
FIG. 2 illustrates an example approach for training a segmentation model for generating pixel-accurate segmentations of surgical tools, according to at least one example.
Figure 3:
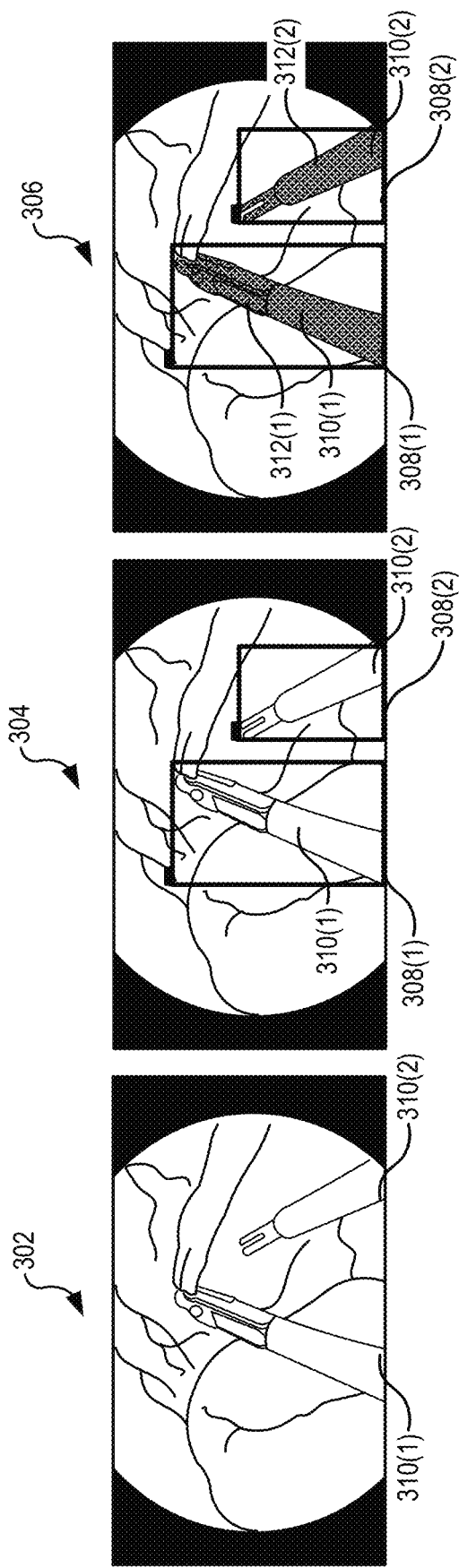
FIG. 3 illustrates a sequence of views of a surgical scene relating to pixel-accurate segmentations of surgical tools, according to at least one example.

Some aspects of FIGS. 1 and 2 will be referenced with the description of FIG. 3. FIG. 3 illustrates a sequence of views 302-306 of a surgical scene relating to pixel-accurate segmentations of surgical tools, according to at least one example. As shown in FIG. 3, the segmentation model 102 relies on weak and fast annotations provided as bounding boxes 308 of surgical tools 310. For example, as shown in FIG. 3, given an image (e.g., the view 302), one or more bounding boxes 308(1) and 308(2) may be annotated around each instrument (e.g., the view 304). The segmentation model 102 may then automatically generate segmentations 312, shown in the view 306, for each surgical tool 310 based on the bounding boxes 308.

The custom segmentation model 102 may be trained using first training data 106 that is based on real images and first segmentations and second training data 108 based on synthetic images and second segmentations. The real images in the first training data 106 may be taken from real surgical scenes that identify surgical tools. The first segmentations in the first training data 106 may be based upon fast and relatively inaccurate bounding box annotations that identify the surgical tools in the real images. The first segmentations in the first training data 106 may be output from a machine learning model that takes the bounding box annotations and real images as input.

The synthetic images in the second training data 108 may be generated using computer models of human anatomy and computer models of surgical tools. These synthetic images may be improved using real images of surgical scenes and adapted to the surgical domain using a machine learning model. The second segmentations in the second training data 108 may be based upon the highly-accurate computer models of the surgical tools.

As compared to the first training data 106, the second training data 108 may include more accurate segmentations and less accurate images. The segmentations of the second training data 108 are more accurate because they are generated from computer models of tools, while the segmentations of the first training data 106 are generated from bounding box annotations of surgical tools. The images of the second training data 108 are less accurate because they are simulated images that are computer-adjusted to simulate surgical scenes, while the images of the first training data 106 are taken from actual real-world surgical scenes. These differences in the training data strike a good balance between costs, computing resources, and accuracy. The result is pixel-accurate segmentations 104 that are more accurate than conventional methods and that are generated at a lower cost and lower computing resource allocation than conventional methods.

The pixel-accurate segmentations 104 may be generated using input images 110 at any suitable time. For example, the custom segmentation model 102 may be configured to take the input images 110 and generate the pixel-accurate segmentations in about real-time. The input images 110 may be streamed or otherwise provided by an image capture device as a series of image frames to the custom segmentation model 102. In this example, the custom segmentation model 102 may output the pixel-accurate segmentations 104 at a rate of around 25 frames per second. In some examples, the rate may be less than or greater than 25 frames per second. Real-time generation of the pixel-accurate segmentations may be suitable for feedback and/or control during laparoscopic surgeries, including those performed by a robotic surgical system. The pixel-accurate segmentations 104 may also be generated with some delay between collection and processing. In some examples, this may be referred to as a post-processing technique. Such techniques may be suitable for identifying tools used, confirming that tools have been removed from surgical environment, and performing other such auditing actions.

FIG. 2 illustrates an example process 200 for training the custom segmentation model 102 for generating pixel-accurate segmentations of surgical tools, according to at least one example. As illustrated, the diagram of FIG. 2 includes a first machine learning model (first MLM) 202, a second machine learning model (second MLM) 204, and a simulation tool 206. Generally, the first MLM 202 may take as input a set of bounding boxes 208 and a set of images 210 corresponding to the set of bounding boxes 208. The view 304 is an example of a bounding box 208 and the view 302 is an example of one of the images 210. The first MLM 202 takes these inputs and generates a set of pixel-accurate segmentations 212 corresponding to each input image 210 and bounding box 208. The view 306 is an example of a pixel-accurate segmentation 212.

Turning now to more details about the first MLM 202, the first MLM 202 may be a neural network architecture that is designed to partially supervised instance segmentation tasks. In a particular example, the first MLM 202 may be a DeepMAC (Deep Mask heads Above CenterNet). Generally, the first MLM 202 is built upon the CenterNet network configured to predict bounding boxes by outputting 3 tensors:

A per-class heatmap which indicates the probability of the bounding-box center being present at each location.

A class-agnostic 2-channel tensor indicating the height and width of the bounding box at each center pixel.

Since the output feature map is typically smaller than the image (stride 4 or 8), CenterNet also predicts x- and y-offsets to recover this discretization error at each center pixel.

To extend CenterNet to segmentation to define the first MLM 202, a fourth pixel embedding branch P in parallel was added to the first MLM 202 to the box-related prediction heads. For each bounding box b, a region Pb is cropped from P corresponding to b via ROIAlign, which results in a 32×32 tensor. Each Pb is fed to a second stage mask-head network, which is based on the Hourglass architecture. The final prediction is a class-agnostic 32×32 tensor which is post-processed into a binary mask at test time by applying a sigmoid and thresholding at 0.5. This mask-head is trained via a per-pixel sigmoid cross-entropy loss averaged over all pixels and instances.

For the first MLM 202 to automatically generate the pixel-accurate segmentations 212 given the bounding boxes 208, the first MLM 202 is been trained on a large scale object detection, segmentation, and captioning dataset (e.g., Common Objects in Context (COCO) dataset). The first MLM 202 may receive as input both images 210 as well as the corresponding bounding boxes 208. Due to the presence of the bounding boxes 208, the first stage of the first stage of the first MLM 202 may be skipped. Instead, the inputs may be fed directly into the second stage mask-head network of the first MLM 202, thereby producing the pixel-accurate segmentation 212 corresponding to the input bounding boxes 208. This may be performed without having to train the first MLM 202 on surgical tools, rather, the training of the first MLM 202 may be limited to the COCO dataset as described above.

After the first MLM 202 has been used to generate the pixel-accurate segmentations 212 for all of the training examples, another segmentation network may be trained. This segmentation network may be based on the CenterNet architecture with the fourth pixel embedding branch, as explained above. This segmentation network may be trained on images (e.g., 210) and their corresponding ground-truth, which includes both bounding boxes 208 and pixel-accurate segmentations 212. As shown in view 306, this automatic pixel-accurate segmentation may be very accurate (e.g., identify the tool accurately). However, the accuracy may be improved by using the synthetic images 214 for training, as described further below.

As introduced above, the diagram of FIG. 2 includes the simulation tool 206 and the second MLM 204. These two objects are used to generate a synthetic image data that is also used to train the custom segmentation model 102. Once trained, output from the custom segmentation model 102 can be used to improve multiple different processes, as described herein.

To begin the simulation tool 206, which is an example of 3D computer graphics software tool set for creating animated films, visual effects, etc. (e.g., Blender3D), may take as input three-dimensional (3D) computer models of surgical tools 216 and organs 218. The simulation tool 206 may also take as input images 210 of real surgical scenes. The images 210 may be selected as ones that do not include surgical tools. The simulation tool 206 may use these inputs to generate synthetic images 214. The synthetic images 214 may include renderings of surgical tools and organs within surgical scenes.

The scenes are made from the 3D models of the surgical tools 216 and the 3D models that depict the background in an abdominal environment (e.g., the 3D models of organs 218). An almost endless number of different scenes can be generated by varying the combination, position and orientation of the surgical tools and background models. In some examples, additional variability can be achieved by randomizing the texture of the tools and backgrounds. The lighting and camera parameters of the simulation tool 206 may be set to match the specifications of typical endoscopes.

To further increase the variability of the synthetic dataset, frames from real laparoscopy procedures (e.g., the images 210) may be used as background to the 3D models of the surgical tools 216. As noted above, the frames without surgical tools are selected from the images 210. The large number of combinations of tools, background models and lighting conditions enables large variability in the dataset that includes the synthetic images 214. For example, this variability may allow the rendered dataset to reach 30K images before gains in the accuracy of the trained model reach a saturation point.

The synthetic images 214, however, may still be improved such that they more closely correspond to real conditions in a surgical environment. This may be achieved by inputting the synthetic images 214 into the second MLM 204. The second MLM 204 may be a trained cycle generative adversarial network (e.g., CycelGAN). The second MLM 204 may be trained to perform domain-adaptation between the 3D rendered images (e.g., the synthetic images 214) and real images. To do this, the second MLM 204 may transform the synthetic images 214 to create the final synthetic dataset, e.g., domain-adapted synthetic images 220. The domain-adapted synthetic images closely resemble the real images.

The simulation tool 206 may also be used to generate pixel-accurate segmentations 222 based on the 3D models of the surgical tools 216. For example, unlike annotations that require medical expertise, the simulation tool 206 can be used to directly output pixel-accurate segmentations 222 because these segmentations are based directly on the 3D models of the surgical tools 216, rather than relying on a computer model to segment surgical tools from a scene.

The first training data (e.g., the images 210 and corresponding pixel-accurate segmentations 212) and the second training data (e.g., the domain-adapted synthetic images 220 and corresponding pixel-accurate segmentations 222) are used to train the custom segmentation model 102. At run-time, the images 210 (without annotations) are provided to the custom segmentation model 102, which predicts a pixel-accurate segmentation for each image 210.

Figure 4:
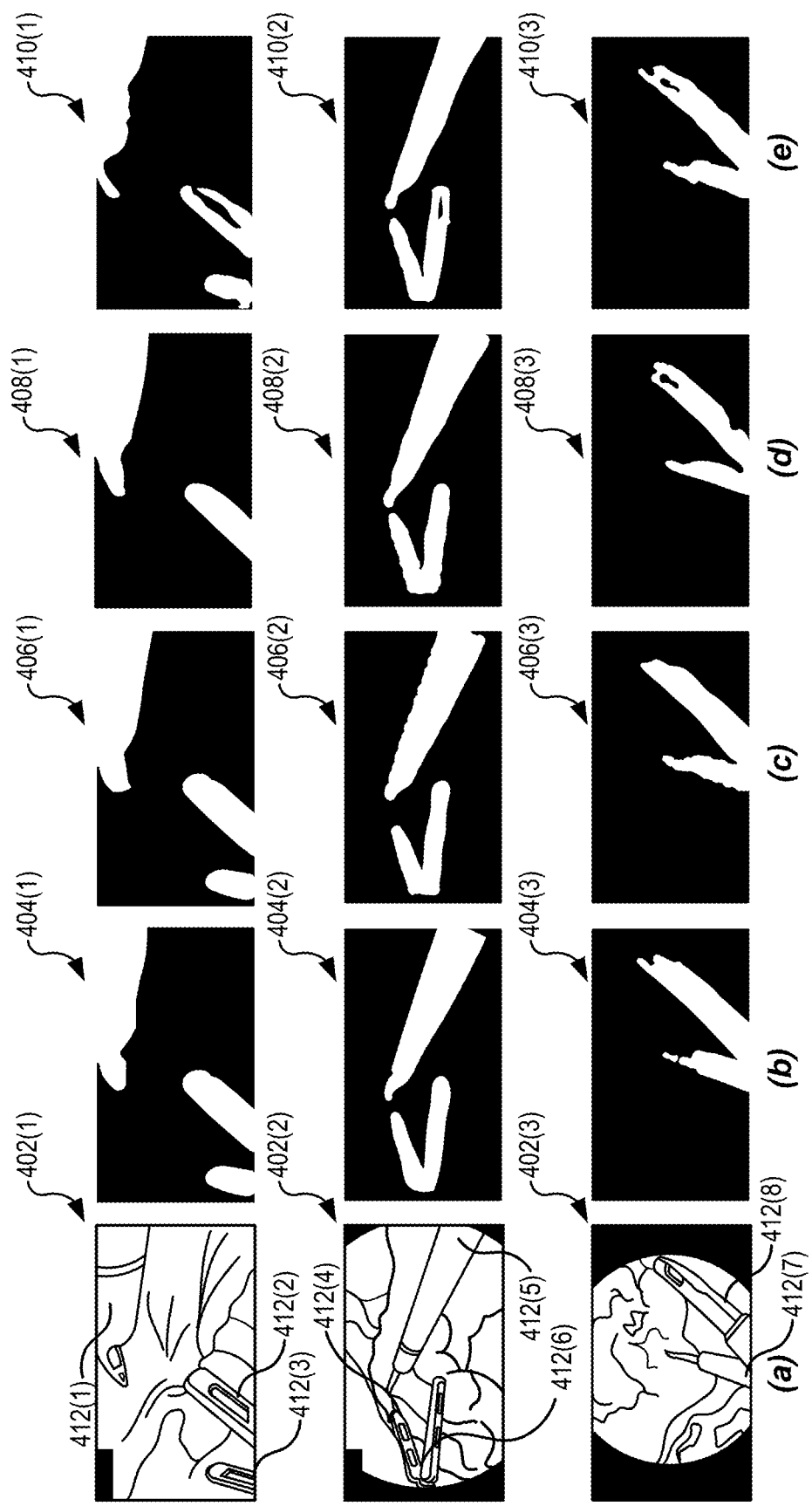
FIG. 4 illustrates a set of images and a set of segmentations generated according to various methods, according to at least one example.

FIG. 4 illustrates a set of images 402 and a set of segmentations 404-410 generated according to various methods, according to at least one example. As described further below, individual segmentations of set of segmentations 404-410 may have been generated using different approaches. Thus, FIG. 4 can be used to compare the results of different approaches for segmentation generations.

Each image 402, shown in column (a), depicts at least one surgical tool 412 within a surgical environment (e.g., within a body of a human subject). Each image 402 is an example of an image that could be input into the custom segmentation model 102.

The segmentations 404 shown in column (b) represent the ground truth segmentations. The segmentations 406 shown in column (c) represent output from models trained using pixel-accurate segmentations only (e.g., the pixel-accurate segmentations 212). The segmentations 408 in column (d) represent output from models trained using bounding box annotations only (e.g., the bounding boxes 208). The segmentations 410 in column (e) represent output from models (e.g., the custom segmentation model 102) trained using synthetic data and real data. Using bounding box annotations only (d) causes some inaccuracies, which are fixed by adding the synthetic data (e), achieving results very similar to the results produced by the model trained on pixel-accurate annotations (c). Note that in some cases (e) outperforms (c), and even sometimes outperforms the ground truth (b), e.g. by placing accurate holes in the tools, as shown in segmentations 410(1)-410(3).

Figure 5:
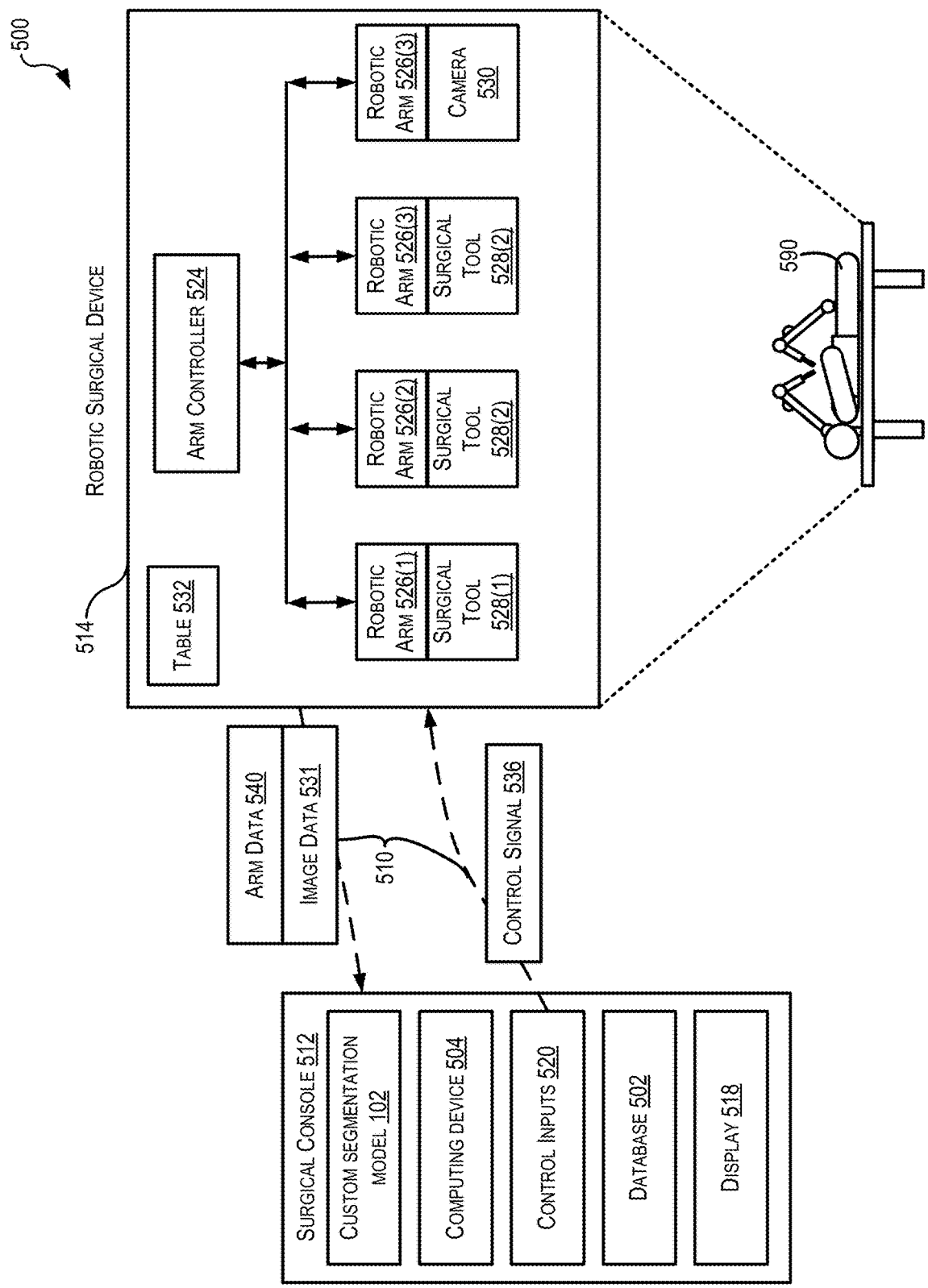
FIG. 5 illustrates an example system for generating and using pixel-accurate segmentations of surgical tools, according to at least one example.

FIG. 5 illustrates an example system 500 for generating and using pixel-accurate segmentations of surgical tools, according to at least one example. The system 500 is a robotic surgical system. It should be understood that the techniques described herein are equally applicable to surgical systems that are not robotic. For example, laparoscopic surgery techniques may benefit from the real-time generation of segmentations based on video feed from an endoscope. In this example, the surgeon or other authorized user may view the video feed that has been adjusted by the segmentations.

The system 500 includes a robotic surgical device 514 and a surgical console 512. In the system 500, the robotic surgical device 415 is configured to operate on a patient 590. The surgical console 512 is connected to the robotic surgical device 514 and configured to be operated by a surgeon to control the robotic surgical device 514 to perform a surgery. The system 500 might also include additional stations (not shown in FIG. 5) that can be used by other personnel in the operating room, for example, to view surgical information, video, etc., sent from the robotic surgical device 514. The robotic surgical device 514, the surgical console 512, and other stations can be connected directly or through a network, such as a local-area network ("LAN"), a wide-area network ("WAN"), the Internet, or any other networking topology known in the art that connects the robotic surgical device 514, the surgical console 512 and other stations.

The robotic surgical device 514 can be any suitable robotic system that can be used to perform surgical procedures on the patient 590. The robotic surgical device 514 includes one or more robotic arms 526(1)-526(4) (which may be referred to individually as a robotic arm 526 or collectively as the robotic arms 526) connected to a base such as a table 532. The robotic arms 526 may be manipulated by control inputs 520, which may include one or more user interface devices, such as joysticks, knobs, handles, or other rotatable or translatable devices to effect movement of one or more of the robotic arms 526. The robotic surgical device 514 includes an arm controller 524 to control the robotic arms 526 based on the control inputs 520. The arm controller 524 controls the positioning and movement of the robotic arms 526 based on a control signal 536 from the surgical console 512 generated by the control inputs 520. The robotic arms 526(1)-(4) may be equipped with one or more surgical tools 528 to perform aspects of a surgical procedure. For example, the robotic arms 526(1)-(3) may be equipped with surgical tools 528(1)-(3) (which may be referred to individually as a surgical tool 528 or collectively as the surgical tools 528). The surgical tools 528 can include, but are not limited to, tools for grasping, for holding, or retracting objects, such as forceps, graspers and retractors, tools for suturing and cutting, such as needle drivers, scalpels and scissors, and other tools that can be used during a surgery. Each of the surgical tools 528 can be controlled by the surgeon through the surgical console 512 including the control inputs 520.

Different surgical devices may be configured for particular types of surgeries, such as cardiovascular surgeries, gastrointestinal surgeries, gynecological surgeries, transplant surgeries, neurosurgeries, musculoskeletal surgeries, etc., while some may have multiple different uses. As a result, different types of surgical robots, including those without robotic arms, such as for endoscopy procedures, may be employed according to different examples. It should be understood that while only one robotic surgical device 514 is depicted, any suitable number of surgical devices 514 may be employed within system 500.

The robotic surgical device 514 is also equipped with one or more cameras 530, such as an endoscope, configured to provide a view of the operating site to guide the surgeon during the surgery. In some examples, the camera 530 can be attached to one of the robotic arms 526(4). In some examples, the camera 530 can be attached to a mechanical structure of the robotic surgical device 514 that is controlled separately from the robotic arms 526 or is stationary with respect to the robotic surgical device 514.

The surgical console 512 includes a display device 518 for providing a feed of image data 534 from the camera 530 as well as patient anatomy models. The image data 534 is transferred to the surgical console 512 over a network 510 along with arm data 540 describing the position of each of the robotic arms 526. The computing device 504 may be local to the surgical console 512 or may be remote.

The display device 518 may display surgical procedure steps for reference by the surgeon based on surgical procedure steps accessed by the computing device 504 from the database 502. The surgical procedure steps may include a predetermined series of surgical steps stored in the database 502 and displayed sequentially on the display device 518. The surgical console 512 may allow the surgeon to indicate a current step being performed and view upcoming steps including movements and positions of the robotic arms 526 to perform the procedure steps.

It should be understood that although FIG. 5 illustrates various components of the system 500, some elements of the system 500, such as the database 502 and the custom segmentation model 102, may be implemented in different ways within the system 500. For example, the functionality described above need not be separated into discrete devices, or some or all of such functionality may be located on a computing device separate from the robotic surgical device 514, the surgical console 512, or the computing device 504 such as a central controlling device connected to the robotic surgical device 514 directly or through the network 510 and configured to control the components of the system 500. In some examples, the custom segmentation model 102 may be implemented in a remote server that shares a network connection with the system 500.

In operation, the camera 530 may obtain one or more images of the surgical scene that includes anatomy of the patient 590 and one or more surgical tools 528. These images, which may be frames in a video feed, are passed to the surgical console 512 over the network 510 as image data 531. The surgical console 512, e.g., the computing device 504, provides the image data 531 as input to the custom segmentation model 102. The custom segmentation model 102 then generates the segmentations, as described herein. The computing device 504 may use the segmentations to perform any suitable function as described herein. For example, the segmentations may be used to adjust a characteristic of the image data 531 that is being feed and output at the display device 518. This can include adjusting white balance of the tools, highlighting tools using annotations, changing the color of the tools, and the like. As an additional example, the segmentations may be used to generate the control signals 536 that are used to control the robotic surgical device 514. This can include the computing device 504 deriving information from the segmentations that relates to position of the surgical tools 528, pose of the robotic arms 526, type of surgical tool 528 being used, and the like.

Figure 6:
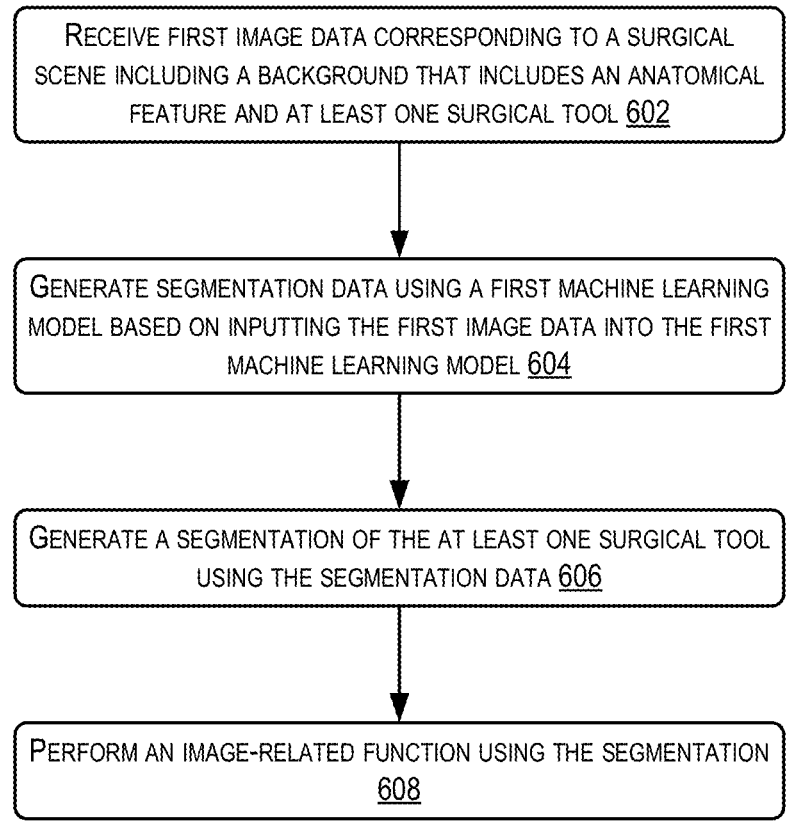
FIG. 6 illustrates an example flowchart illustrating a process for generating and using pixel-accurate segmentations of surgical tools, according to at least one example.
Figure 7:
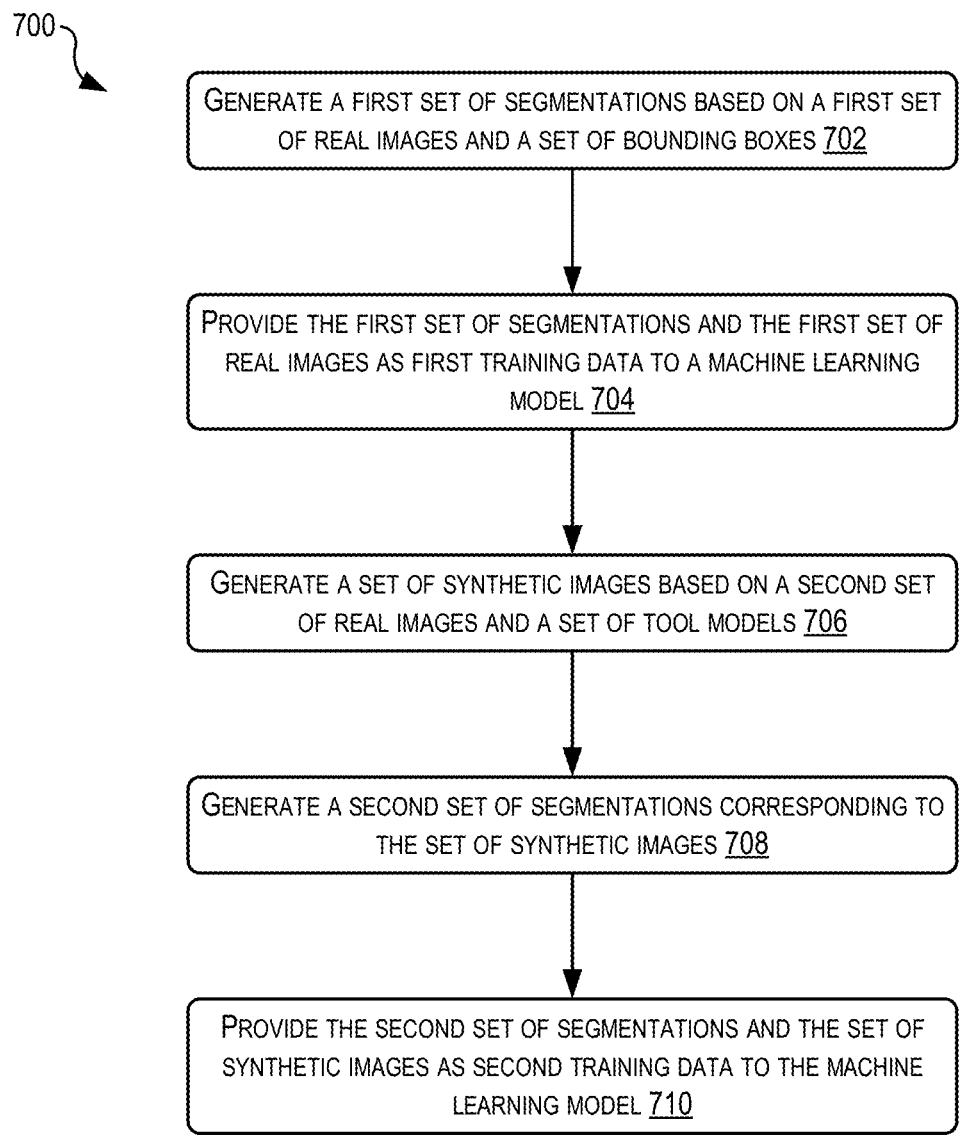
FIG. 7 illustrates an example flowchart illustrating a process for training a segmentation model, according to at least one example.

FIGS. 6 and 7 illustrate example flow diagrams showing processes 600 and 700, according to at least a few examples. These processes, and any other processes described herein (e.g., the processes 100 and 200), are illustrated as logical flow diagrams, each operation of which represents a sequence of operations that can be implemented in hardware, computer instructions, or a combination thereof. In the context of computer instructions, the operations may represent computer-executable instructions stored on one or more non-transitory computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the processes described herein may be performed under the control of one or more computer systems configured with specific executable instructions and may be implemented as code (e.g., executable instructions, one or more computer programs, or one or more applications) executing collectively on one or more processors, by hardware, or combinations thereof. As noted above, the code may be stored on a non-transitory computer readable storage medium, for example, in the form of a computer program including a plurality of instructions executable by one or more processors.

Figure 8:
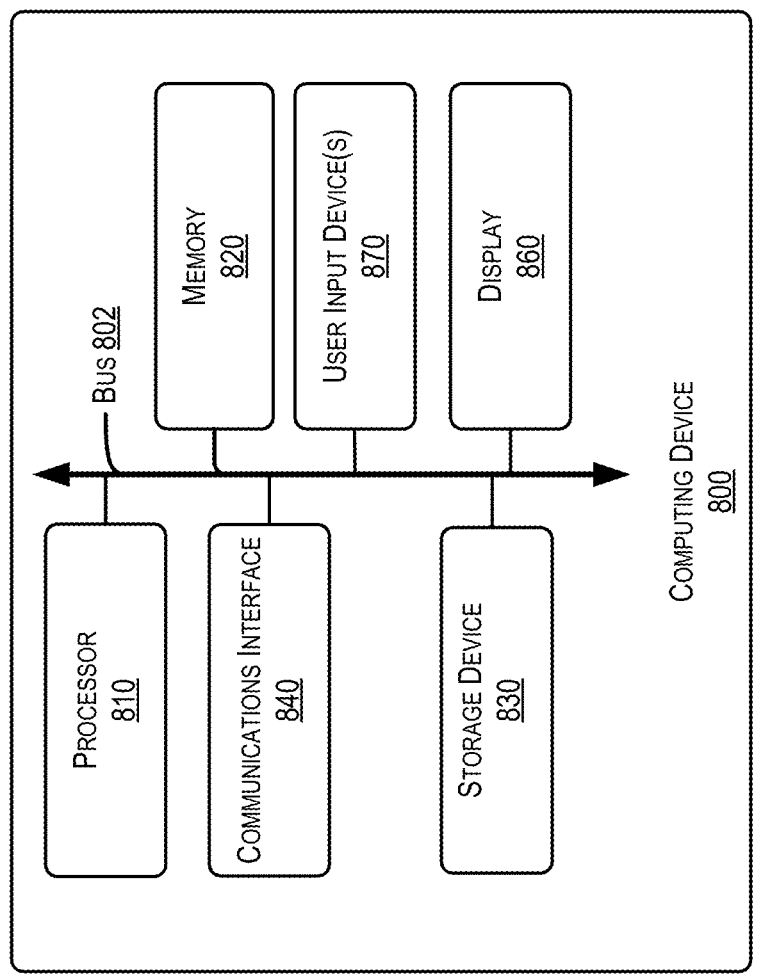
FIG. 8 illustrates a simplified block diagram depicting an example device for implementing one or more example methods of the description, according to at least one example.

FIG. 6 illustrates an example flowchart illustrating the process 600 for generating and using pixel-accurate segmentations of surgical tools, according to at least one example. The process 600 is performed by the computing device 800 (FIG. 8). The process 600 in particular corresponds to using a custom segmentation model trained in the manner described herein.

The process 600 begins at block 602 by the computing device 800 receiving first image data corresponding to a surgical scene and including a background that includes an anatomical feature and at least one surgical tool. The surgical scene may be an internal anatomy of a patient. The anatomical feature may be an organ, tissue, or other part of the internal anatomy of the patient. The surgical tool may be a surgical instrument or other tool for performing a surgery on the internal anatomy, which may include, for example, scalpels, scissors, forceps, clamps, needles, sutures, retractors, suction tips, staplers and clips, endostaplers, electrosurgery device, ultrasonic blade, camera, light source, laparoscopic instruments trocars, saws, robotic arms, end effectors, and any other suitable instrument for use in a surgical environment.

At block 602, the process 600 includes the computing device 800 generating segmentation data using a first machine learning model based on inputting the first image data to the first machine learning model. The first machine learning model may be the custom segmentation model 102 described herein. In some examples, the first machine learning model may be based on:

a first set of segmentations output from a second machine learning model based on a first set of inputs including (i) a set of real images of a first set of surgical scenes, and (ii) a set of bounding boxes identifying a set of real surgical tools in the set of real images;

a set of synthetic images of a second set of surgical scenes; and a second set of segmentations corresponding to the set of synthetic images.

In some examples, a first subset of synthetic images of the set of synthetic images are based at least in part on organ models representing synthetic backgrounds and surgical tool models. A second subset of synthetic images of the set of synthetic images may be based at least in part on real image frames representing real backgrounds and the surgical tool models.

In some examples, the first set of surgical scenes may include real surgical scenes, and the second set of surgical scenes may include synthetic surgical scenes generated using a rendering tool. In some examples, each segmentation of the second set of segmentations represents at least one simulated surgical tool of at least one synthetic image of the set of synthetic images. In some examples, the set of synthetic images and the second set of segmentations are generated by the rendering tool.

In some examples, the set of synthetic images may be adapted to a surgical domain using a deep convolutional neural network (e.g., a Cycle Generative Adversarial Network).

The second machine learning model may include a neural network architecture configured for partially supervised segmentation tasks. In some examples, the neural network architecture may include a DeepMAC model. In some examples, the second machine learning model may be the first MLM 202.

At block 606, the process 600 includes the computer device 800 generating a segmentation of the at least one surgical tool using the segmentation data.

At block 608, the process 600 includes the computer device 800 performing an image-related function using the segmentation. In some examples, the segmentation may include a binary image mask that identifies the at least one surgical tool and excludes the background. In some examples, each segmentation of the first set of segmentations represents at least one real surgical tool of at least one real image of the set of real images. In some examples, the first image data corresponds to an image of the surgical scene. In this example, performing the image-related function may include adjusting a characteristic of the image using the segmentation. In some examples, the image is a frame in a video feed from a laparoscopic camera that is viewing the surgical scene. In some examples, the at least one surgical tool is in use during a surgical procedure upon the anatomical feature.

In some examples, performing the image-related function may include generating a record of use of the at least one surgical tool using the segmentation, and recording the record of use in a database. In some examples, performing the image-related function may include using the segmentation to estimate a cost of a surgical procedure that uses the at least one surgical tool.

In some examples, the process 600 may further include training the first machine learning model by at least generating the first set of segmentations by inputting the set of real images and the set of bounding boxes into the second machine learning model, providing the first set of segmentations and the set of real images as first training data for the first machine learning model, generating the set of synthetic images by inputting a different set of real images and a set of three-dimensional tool models into a rendering tool, generating the second set of segmentations by inputting the set of three-dimensional tool models into the rendering tool, providing the set of synthetic images and the second set of segmentations as second training data for the first machine learning model.

In some examples, generating the set of synthetic images may further include generating adapted versions of the synthetic images by inputting the set of synthetic images into a third machine learning model that adapts the set of synthetic images to a surgical domain. In this example, providing the set of synthetic images as the second training data may include providing the adapted versions of the set of synthetic images. The third machine learning model may be the second MLM 204.

In some examples, the first machine learning model may include a custom-trained segmentation model, the second machine learning model may include a DeepMAC model, the third machine learning model may include a CycleGAN model, and the rendering tool may include Blender3D.

In some examples, at least a portion of the process 600 may be implemented by a remote computing system. In this example, receiving the image data may include receiving, by the remote computing system, the image data from a local computing device that receives the image data from a camera. In this example, the process 600 may further include sending, by the remote computer system, second image data to the local computing device. The second image data may correspond to an image of the surgical scene that has been modified by the segmentation.

FIG. 7 illustrates an example flowchart illustrating a process 700 for training a segmentation model, according to at least one example. The segmentation model may correspond to the custom segmentation model 102. The process 700 is performed by the computing device 800 (FIG. 8). The process 700 in particular corresponds to training a custom segmentation model.

The process 700 begins at block 702 by the computing device 800 generating a first set of segmentations based on a first set of real images and a set of bounding boxes. The first set of segmentations corresponds to pixel-accurate segmentations 212, the first set of real images corresponds to a first subset of the images 210, and the set of bounding boxes corresponds to the bounding boxes 208 that are associated with the first subset of images 210.

At block 704, the process 700 includes the computing device 800 providing the first set of segmentations and the first set of real images as first training data to a machine learning model. The first set of segmentations (e.g., 212) and the first set of real images (e.g., 210) may make up the first training data (e.g., 106) that is input into the machine learning model (e.g., the custom segmentation model 102).

At block 706, the process 700 includes the computing device 800 generating a set of synthetic images based on a second set of real images and a set of tool models. The set of synthetic images corresponds to the synthetic images 214, the second set of real images corresponds to a second subset of the images 210, and the set of tool models corresponds to the tool models 216.

At block 708, the process 700 includes the computing device 800 generating a second set of segmentations corresponding to the set of synthetic images. The second set of segmentations may correspond to the pixel-accurate segmentations 222, which may be generated by the simulation tool 206. The set of segmentations may be segmentations of surgical tools represented in the set of synthetic images.

At block 710, the process 700 includes the computing device 800 providing the second set of segmentations and the set of synthetic images as second training data to the machine learning model. The second training data (e.g., 108) may be input into the custom segmentation model 102.

In some examples, the process 700 further includes inputting the synthetic images into a different machine learning model (e.g., the second MLM 204). This action may adapt the synthetic images to a surgical domain. In this example, the adapted synthetic images may be used in block 710 in place of the synthetic images that have not been domain adapted.

FIG. 8 illustrates a simplified block diagram depicting an example device 800 for implementing one or more example methods of the description, according to at least one example. For example, the computing device 800 may make up the surgical console 512 and/or the computing device 504. The computing device 800 includes a processor 810 which is in communication with the memory 820 and other components of the computing device 800 using one or more communications buses 802. The processor 810 is configured to execute processor-executable instructions stored in the memory 820 to perform the techniques described herein, such as part or all of the example processes 100, 200, 600, and 700 described. The computing device 800, in this example, also includes one or more user input devices 870, such as a keyboard, mouse, touchscreen, microphone, etc., to accept user input. The computing device 800 also includes a display to provide visual output to a user.

The computing device 800 can include or be connected to one or more storage devices 830 that provides non-volatile storage for the computing device 800. The storage devices 830 can store system or application programs and data used by the computing device 800. The storage devices 830 might also store other programs and data not specifically identified in this description.

The computing device 800 also includes a communications interface 840. In some examples, the communications interface 840 may enable communications using one or more networks, including a LAN; WAN, such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems are described in terms of software executing on various machines, the methods and systems may also be implemented as specifically configured hardware, such as field-programmable gate array ("FPGA") specifically to execute the various methods. For example, examples may be implemented in digital electronic circuitry, or in computer hardware, firmware, software, or in a combination thereof. In one example, a device may include a processor or processors. The processor includes a computer-readable medium, such as a random access memory ("RAM") coupled to the processor. The processor executes processor-executable program instructions stored in memory, such as executing one or more computer programs. Such processors may include a microprocessor, a digital signal processor ("DSP"), an application-specific integrated circuit ("ASIC"), field programmable gate arrays ("FPGAs"), and state machines. Such processors may further include programmable electronic devices such as PLCs, programmable interrupt controllers ("PICs"), programmable logic devices ("PLDs"), programmable read-only memories ("PROMs"), electronically programmable read-only memories ("EPROMs" or "EEPROMs"), or other similar devices.

Such processors may include, or may be in communication with, media, for example computer-readable storage media, that may store instructions that, when executed by the processor, can cause the processor to perform the steps described as carried out, or assisted, by a processor. Examples of computer-readable media may include, but are not limited to, an electronic, optical, magnetic, or other storage device that may provide a processor, such as the processor in a web server, with computer-readable instructions. Other examples of media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may include code executable to carry out one or more of the methods (or parts of methods) discussed below with respect to FIGS. 7 through 9.

In the following, further example clauses are described to facilitate the understanding of the present disclosure.

Clause 1. In this example, there is provided a computer-implemented method, comprising:
  receiving first image data corresponding to a surgical scene comprising a background that includes an anatomical feature and at least one surgical tool;
  generating segmentation data using a first machine learning model based on inputting the first image data to the first machine learning model, wherein the first machine learning model is based on:
    a first set of segmentations output from a second machine learning model based on a first set of inputs comprising (i) a set of real images of a first set of surgical scenes, and (ii) a set of bounding boxes identifying a set of real surgical tools in the set of real images;
    a set of synthetic images of a second set of surgical scenes; and
    a second set of segmentations corresponding to the set of synthetic images;
  generating a segmentation of the at least one surgical tool using the segmentation data; and
  performing an image-related function using the segmentation.

Clause 2. In this example, there is provided the computer-implemented method of clause 1, wherein the second machine learning model comprises a neural network architecture configured for partially supervised segmentation tasks.

Clause 3. In this example, there is provided the computer-implemented method of clause 2, wherein the neural network architecture comprises a DeepMAC model.

Clause 4. In this example, there is provided the computer-implemented method of clause 1, wherein the segmentation comprises a binary image mask that identifies the at least one surgical tool and excludes the background.

Clause 5. In this example, there is provided the computer-implemented method of clause 1, wherein a first subset of synthetic images of the set of synthetic images are based at least in part on organ models representing synthetic backgrounds and surgical tool models.

Clause 6. In this example, there is provided the computer-implemented method of clause 5, wherein a second subset of synthetic images of the set of synthetic images is based at least in part real image frames representing real backgrounds and the surgical tool models.

Clause 7. In this example, there is provided the computer-implemented method of clause 1, further comprising training the first machine learning model by at least:
  generating the first set of segmentations by inputting the set of real images and the set of bounding boxes into the second machine learning model;
  providing the first set of segmentations and the set of real images as first training data for the first machine learning model;
  generating the set of synthetic images by inputting a different set of real images and a set of three-dimensional tool models into a rendering tool;
  generating the second set of segmentations by inputting the set of three-dimensional tool models into the rendering tool; and
  providing the set of synthetic images and the second set of segmentations as second training data for the first machine learning model.

Clause 8. In this example, there is provided the computer-implemented method of clause 7, wherein generating the set of synthetic images further comprises generating adapted versions of the set of synthetic images by inputting the set of synthetic images into a third machine learning model that adapts the set of synthetic images to a surgical domain, wherein providing the set of synthetic images as the second training data comprises providing the adapted versions of the set of synthetic images.

Clause 9. In this example, there is provided the computer-implemented method of clause 8, wherein the first machine learning model comprises a custom-trained segmentation model, the second machine learning model comprises a DeepMAC model, the third machine learning model comprises a CycleGAN model, and the rendering tool comprises Blender3D.

Clause 10. In this example, there is provided A non-transitory computer-readable storage device comprising computer-executable instructions that, when executed by a computer system, cause the computer system to perform operations comprising:
  receiving first image data corresponding to a surgical scene comprising a background that includes an anatomical feature and at least one surgical tool;
  generating segmentation data using a first machine learning model based on inputting the first image data to the first machine learning model, wherein the first machine learning model is based on:
    a first set of segmentations output from a second machine learning model based on a first set of inputs comprising (i) a set of real images of a first set of surgical scenes, and (ii) a set of bounding boxes identifying a set of real surgical tools in the set of real images;
    a set of synthetic images of a second set of surgical scenes; and
    a second set of segmentations corresponding to the set of synthetic images;
  generating a segmentation of the at least one surgical tool using the segmentation data; and
  performing an image-related function using the segmentation.

Clause 11. In this example, there is provided the non-transitory computer-readable storage device of clause 10, wherein the first set of surgical scenes are real surgical scenes, and the second set of surgical scenes are synthetic surgical scenes.

Clause 12. In this example, there is provided the non-transitory computer-readable storage device of clause 10, wherein each segmentation of the second set of segmentations represents at least one simulated surgical tool of at least one synthetic image of the set of synthetic images.

Clause 13. In this example, there is provided the non-transitory computer-readable storage device of clause 10, wherein the set of synthetic images and the second set of segmentations are generated by a rendering tool.

Clause 14. In this example, there is provided the non-transitory computer-readable storage device of clause 10, wherein the set of synthetic images are adapted to a surgical domain using a deep convolutional neural network.

Clause 15. In this example, there is provided the non-transitory computer-readable storage device of clause 14, wherein the deep convolutional neural network comprises a Cycle Generative Adversarial Network.

Clause 16. In this example, there is provided the non-transitory computer-readable storage device of clause 14, wherein the second set of segmentations is generated by a rendering tool.

Clause 17. In this example, there is provided the non-transitory computer-readable storage device of clause 10, wherein each segmentation of the first set of segmentations represents at least one real surgical tool of at least one real image of the set of real images.

Clause 18. In this example, there is provided the non-transitory computer-readable storage device of clause 10, wherein the first image data corresponds to an image of the surgical scene, and wherein performing the image-related function comprises adjusting a characteristic of the image using the segmentation.

Clause 19. In this example, there is provided the non-transitory computer-readable storage device of clause 18, wherein the image is a frame in a video feed from a laparoscopic camera that is viewing the surgical scene.

Clause 20. In this example, there is provided the non-transitory computer-readable storage device of clause 18, wherein the at least one surgical tool is in use during a surgical procedure upon the anatomical feature.

Clause 21. In this example, there is provided a system, comprising:
  a memory configured to store computer-executable instructions; and
  a processor configured to access the memory and execute the computer-executable instructions to at least:
    receive first image data corresponding to a surgical scene comprising a background that includes an anatomical feature and at least one surgical tool;
    generate segmentation data using a first machine learning model based on inputting the first image data to the first machine learning model, wherein the first machine learning model is based on:
      a first set of segmentations output from a second machine learning model based on a first set of inputs comprising (i) a set of real images of a first set of surgical scenes, and (ii) a set of bounding boxes identifying a set of real surgical tools in the set of real images;
      a set of synthetic images of a second set of surgical scenes; and
      a second set of segmentations corresponding to the set of synthetic images;
    generate a segmentation of the at least one surgical tool using the segmentation data; and
    perform an image-related function using the segmentation.

Clause 22. In this example, there is provided the system of clause 21, wherein performing the image-related function comprises:
  generating a record of use of the at least one surgical tool using the segmentation; and
  recording the record of use in a database.

Clause 23. In this example, there is provided the system of clause 21, wherein performing the image-related function comprises using the segmentation to estimate a cost of a surgical procedure that uses the at least one surgical tool.

Clause 24. In this example, there is provided the system of clause 21, wherein the system is a remote computing system, wherein receiving the first image data comprises receiving, by the remote computing system, the first image data from a local computing device.

Clause 25. In this example, there is provided the system of clause 24, wherein the memory is configured to store additional computer-executable instructions that, when executed by the processor, cause the system to at least send, by the remote computer system, second image data to the local computing device, and wherein the second image data corresponds to an image of the surgical scene that has been modified by the segmentation.

Clause 26. In this example, there is provided the system of clause 21, wherein the segmentation comprises a pixel-accurate segmentation.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computing systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements, and/or steps are included or are to be performed in any particular example.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and all three of A and B and C.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving first image data corresponding to a surgical scene comprising a background that includes an anatomical feature and at least one surgical tool;
   generating segmentation data using a custom segmentation model based on inputting the first image data to the custom segmentation model, wherein the custom segmentation model is based on:
   a first set of segmentations output from a first machine learning model based on a first set of inputs comprising (i) first images of a set of real images of a first set of surgical scenes, and (ii) a set of bounding boxes identifying a set of real surgical tools in the first images of the set of real images;
   a set of domain adapted synthetic images output from a second machine learning model based on a set of synthetic images of a second set of surgical scenes output from a simulation tool, wherein the simulation tool takes as input a second set of inputs comprising (i) three-dimensional models of surgical tools, (ii) three-dimensional models of organs, and (iii) second images of the first set of real images that exclude surgical tools; and
   a second set of segmentations output from the simulation tool and corresponding to the set of synthetic images;
   generating a segmentation of the at least one surgical tool using the segmentation data; and
   performing an image-related function using the segmentation.

2. The computer-implemented method of claim 1, wherein the first machine learning model comprises a neural network architecture configured for partially supervised segmentation tasks.

3. The computer-implemented method of claim 2, wherein the neural network architecture comprises a Deep-MAC model.

4. The computer-implemented method of claim 1, wherein the segmentation comprises a binary image mask that identifies the at least one surgical tool and excludes the background.

5. The computer-implemented method of claim 1, wherein a first subset of synthetic images of the set of synthetic images are based at least in part on a subset of the three-dimensional models of organs representing synthetic backgrounds and a subset of the three-dimensional models of the surgical tool.

6. The computer-implemented method of claim 5, wherein a second subset of synthetic images of the set of synthetic images is based at least in part on the second images of the first set of real images representing real backgrounds and a second subset of the three-dimensional models of the surgical tool.

7. The computer-implemented method of claim 1, further comprising training the first machine learning model by at least:

generating the first set of segmentations by inputting the first images of the set of real images and the set of bounding boxes into the first machine learning model;

providing the first set of segmentations and the first images of the set of real images as first training data for the custom segmentation model;

generating the set of synthetic images by inputting the second images of the first set of real images and a subset of the three-dimensional models of surgical tools into the simulation tool;

generating the second set of segmentations by inputting the subset of the three-dimensional models of surgical tools into the simulation tool; and providing the set of synthetic images and the second set of segmentations as second training data for the custom segmentation model.

8. The computer-implemented method of claim 7, wherein generating the set of synthetic images further comprises generating adapted versions of the set of synthetic images by inputting the set of synthetic images into the second machine learning model that adapts the set of synthetic images to a surgical domain to define the set of domain adapted synthetic images, wherein providing the set of synthetic images as the second training data comprises providing the set of domain adapted synthetic images.

9. The computer-implemented method of claim 8, wherein the custom segmentation model comprises a custom-trained segmentation model, the first machine learning model comprises a DeepMAC model, the second machine learning model comprises a CycleGAN model, and the simulation tool comprises Blender3D.

10. A non-transitory computer-readable storage device comprising computer-executable instructions that, when executed by a computer system, cause the computer system to perform operations comprising:

receiving first image data corresponding to a surgical scene comprising a background that includes an anatomical feature and at least one surgical tool;

generating segmentation data using a custom segmentation model based on inputting the first image data to the custom segmentation model, wherein the custom segmentation model is based on:

a first set of segmentations output from a first machine learning model based on a first set of inputs comprising (i) first images of a set of real images of a first set of surgical scenes, and (ii) a set of bounding boxes identifying a set of real surgical tools in the first images of the set of real images;

a set of domain adapted synthetic images output from a second machine learning model based on a set of synthetic images of a second set of surgical scenes output from a simulation tool, wherein the simulation tool takes as input a second set of inputs comprising (i) three-dimensional models of surgical tools, (ii) three-dimensional models of organs, and (iii) second images of the first set of real images that exclude surgical tools; and a second set of segmentations output from the simulation tool and corresponding to the set of synthetic images;

generating a segmentation of the at least one surgical tool using the segmentation data; and performing an image-related function using the segmentation.

11. The non-transitory computer-readable storage device of claim 10, wherein the first set of surgical scenes are real surgical scenes, and the second set of surgical scenes are synthetic surgical scenes.

12. The non-transitory computer-readable storage device of claim 10, wherein each segmentation of the second set of segmentations represents at least one simulated surgical tool of at least one synthetic image of the set of synthetic images.

13. The non-transitory computer-readable storage device of claim 10, wherein the set of synthetic images and the second set of segmentations are generated by the simulation tool.

14. The non-transitory computer-readable storage device of claim 10, wherein the set of synthetic images are adapted to a surgical domain using the second machine learning model that comprises a deep convolutional neural network.

15. The non-transitory computer-readable storage device of claim 14, wherein the deep convolutional neural network comprises a Cycle Generative Adversarial Network.

16. The non-transitory computer-readable storage device of claim 10, wherein each segmentation of the first set of segmentations represents at least one real surgical tool of at least one real image of the first images of the set of real images.

17. The non-transitory computer-readable storage device of claim 10, wherein the first image data corresponds to an image of the surgical scene, and wherein performing the image-related function comprises adjusting a characteristic of the image using the segmentation.

18. The non-transitory computer-readable storage device of claim 17, wherein the image is a frame in a video feed from a laparoscopic camera that is viewing the surgical scene.

19. The non-transitory computer-readable storage device of claim 17, wherein the at least one surgical tool is in use during a surgical procedure upon the anatomical feature.

20. A system, comprising:

a memory configured to store computer-executable instructions; and a processor configured to access the memory and execute the computer-executable instructions to at least:

receive first image data corresponding to a surgical scene comprising a background that includes an anatomical feature and at least one surgical tool;

generate segmentation data using a custom segmentation model based on inputting the first image data to the custom segmentation model, wherein the custom segmentation model is based on:

a first set of segmentations output from a first machine learning model based on a first set of inputs comprising (i) first images of a set of real images of a first set of surgical scenes, and (ii) a set of bounding boxes identifying a set of real surgical tools in the first images of the set of real images;

a set of domain adapted synthetic images output from a second machine learning model based on a set of synthetic images of a second set of surgical scenes output from a simulation tool, wherein the simulation tool takes as input a second set of inputs comprising (i) three-dimensional models of surgical tools, (ii) three-dimensional models of organs, and (iii) second images of the first set of real images that exclude surgical tools; and a second set of segmentations output from the simulation tool and corresponding to the set of synthetic images;

generate a segmentation of the at least one surgical tool using the segmentation data; and perform an image-related function using the segmentation.

21. The system of claim 20, wherein performing the image-related function comprises:

generating a record of use of the at least one surgical tool using the segmentation; and recording the record of use in a database.

22. The system of claim 20, wherein performing the image-related function comprises using the segmentation to estimate a cost of a surgical procedure that uses the at least one surgical tool.

23. The system of claim 20, wherein the system is a remote computing system, wherein receiving the first image data comprises receiving, by the remote computing system, the first image data from a local computing device.

24. The system of claim 23, wherein the memory is configured to store additional computer-executable instructions that, when executed by the processor, cause the system to at least send, by the remote computer system, second image data to the local computing device, and wherein the second image data corresponds to an image of the surgical scene that has been modified by the segmentation.

25. The system of claim 20, wherein the segmentation comprises a pixel-accurate segmentation.

\* \* \* \* \*